United States Patent [19]

Breuers

[11] Patent Number: 4,579,759

[45] Date of Patent: Apr. 1, 1986

[54] INSCRIBABLE CABLE MARKING STRIP

[75] Inventor: Manfred O. Breuers, Rödermark, Fed. Rep. of Germany

[73] Assignee: Idento Gesellschaft für industrielle Kennzeichnung mbH, Rödermark, Fed. Rep. of Germany

[21] Appl. No.: 708,890

[22] Filed: Mar. 6, 1985

[30] Foreign Application Priority Data

Mar. 15, 1984 [DE] Fed. Rep. of Germany ... 8407967[U]

[51] Int. Cl.⁴ ............................ B32B 3/02; C09J 7/02

[52] U.S. Cl. ........................................ 428/36; 283/81; 428/192; 428/203; 428/204; 428/205; 428/343

[58] Field of Search ................. 428/36, 203, 192, 204, 428/205, 343; 283/81

[56] References Cited

U.S. PATENT DOCUMENTS

| | | | |
|---|---|---|---|
| 3,874,893 | 4/1975 | Cherrin | 428/203 X |
| 3,955,020 | 5/1976 | Cavanagh et al. | 428/203 X |
| 4,363,401 | 12/1982 | Savagian | 428/36 X |
| 4,461,793 | 7/1984 | Blok et al. | 428/36 |

*Primary Examiner*—Thomas J. Herbert

*Attorney, Agent, or Firm*—Burns, Doane, Swecker & Mathis

[57] ABSTRACT

A cable marking strip comprises a strip of an adhesive tape having a self-adhering bottom side and carrying an inscribable marking section. The beginning of the inscribable marking section is located at a distance from the adjacent front end of the adhesive tape to define an unlettered, transparent starting section of the strip which may be pressed onto the cable without soiling the marking section or smudging the lettering applied to it.

3 Claims, 3 Drawing Figures

INSCRIBABLE CABLE MARKING STRIP

BACKGROUND AND OBJECTS OF THE INVENTION

The invention concerns an inscribable cable marking strip, comprising a predominantly transparent adhesive tape having a self-adhesive underside and comprising, at the front of the strip, an inscribable marking section.

Cable marking strips of this type are used for the identification of cables. The self-adhesive cable marking strips disposed adjacent to each other or over each other on a carrier sheet have in their conventional configuration immediately at the upper onset of the strip, i.e., the leading end, an inscribable marking section, to be lettered by the user prior to winding the cable marking strip around the cable to be identified.

The section of the transparent adhesive tape following the marking section and several times longer than the respective marking section, is wound around the cable so that it covers the previously applied marking section, thereby preventing the soiling or smudging of the lettering. As, however, the marking section is located at the front or leading end of the strip which must be pressed onto the cable at the onset of the winding process, there is a danger that the user will obliterate the previously applied lettering by pressing the front end of the strip with his thumb onto the cable. Furthermore, since the fingers of the user frequently become soiled in the course of the work immediate preceding this operation, it is also possible that the marking section will become soiled during its application before it can be protected by the transparent tape section wound over it.

It is, therefore, the object of the invention to design a marking strip of the aforementioned type so that the danger of the marking section becoming soiled and the previously applied lettering smudged during its application to the cable to be identified is largely eliminated.

SUMMARY OF THE INVENTION

This object is attained according to the present invention in that the beginning or leading edge of the inscribable marking section is located at a distance from the adjacent front or leading end of the adhesive tape. In this manner, at the front end of the strip which is pressed onto the cable at the start of the fastening process, a short transparent section of the tape is provided that has no marking surface and therefore carries no lettering. It may be pressed by the user safely onto the cable, in order to establish an initial connection between the cable marking strip and the cable. As the transparent initial section of the cable marking strip has a relatively smooth surface and carries no lettering, there is no danger of soiling or of smudging the lettering.

The subsequent section of the strip which carries the marking section with the lettering, is wound without pressure and only under tension onto the cable; a physical contact of the user's fingers with the surface of the marking section is not required. In the course of the further winding of the cable with the subsequent transparent strip section, the marking section is covered and protected.

BRIEF DESCRIPTION OF THE DRAWINGS

The invention shall be explained below with the aid of an example embodiment shown in the drawing, in which.

DETAILED DESCRIPTION OF A PREFERRED EMBODIMENT OF THE INVENTION

Figure 1:
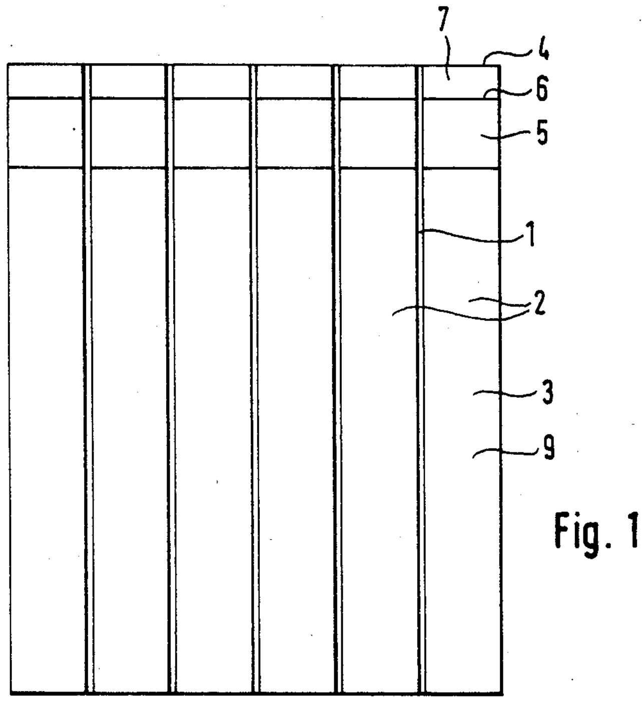
FIG. 1 shows a top view of several cable marking strips, mounted adjacently to each other on a common carrier sheet.

On a common carrier sheet 1 (FIG. 1), several cable marking strips 2 are adhesively mounted adjacent to each other so that they may be removed individually for use. Each of the cable marking strips 2 comprises a strip of a self-adhesive transparent tape 3. Near its upper or leading end 4, each adhesive strip 3 is provided at its surface with a marking section 5, formed, for example, by an inscribable layer printed on the top side of the transparent adhesive tape 3.

Figure 2:
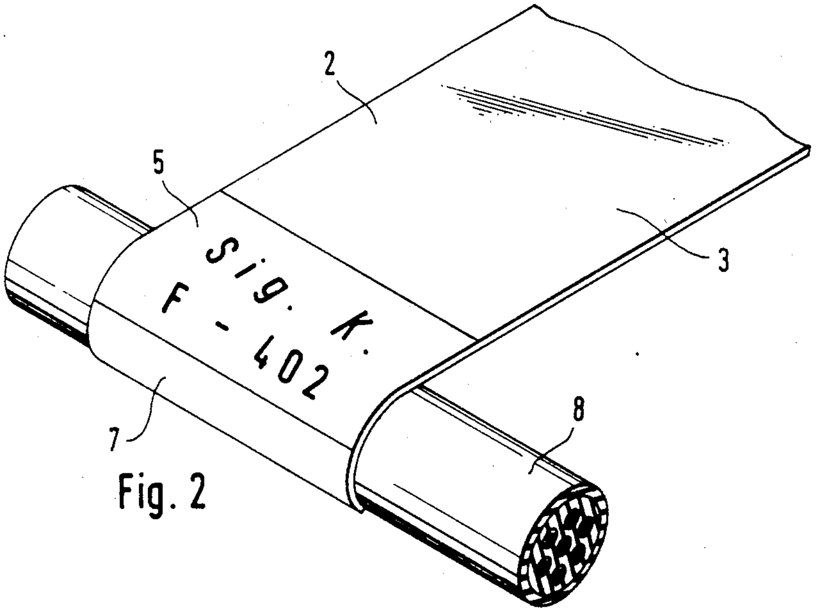
FIG. 2 depicts, at an enlarged scale, a cable marking strip at the start of its application to a cable.

As seen with particular clarity in FIGS. 1 and 2, the upper or leading edge 6 constituting the beginning of the inscribable marking section 5 is arranged at a distance from the adjacent start 4 of the adhesive tape 3. In this manner, each marking strip 2 is provided at its front end with a transparent, adhesive, noninscribable initial section 7. Preferably, the edge 6 is spaced at least 5 mm from the end 4.

Figure 3:
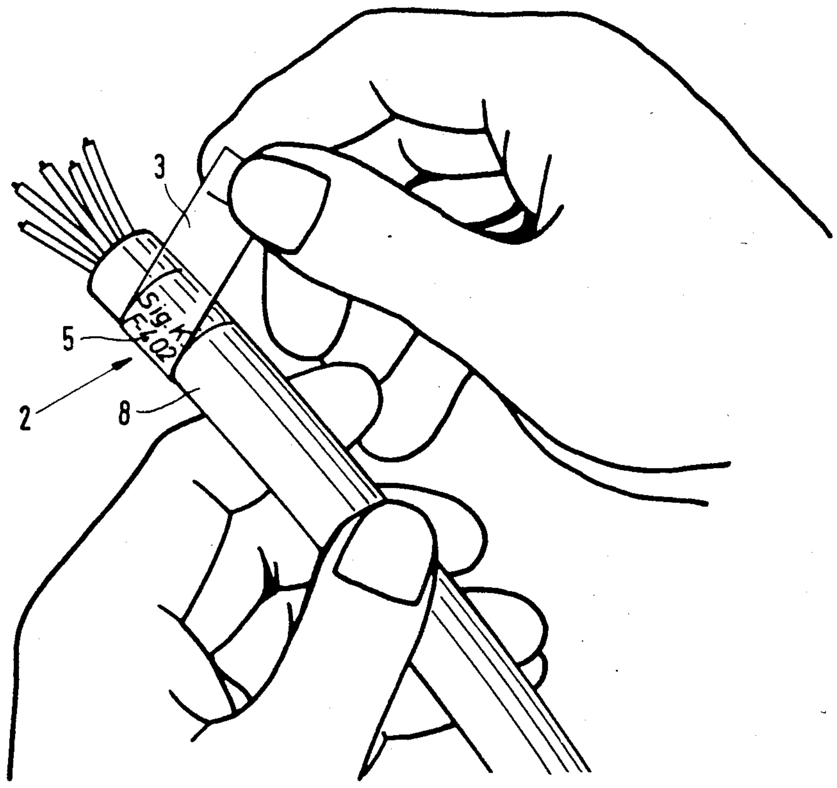
FIG. 3 depicts the manipulation of the cable marking strip according to FIG. 2.

Following the lettering of the marking section 5 with the identification desired, which may be effected while the strip is still on the carrier sheet 1, the cable marking strip 2 is pulled off the carrier sheet 1 and pressed with its transparent starting section 7 onto the cable 8 (FIG. 2) to be marked. As in the process, the user is pressuring only the unlettered transparent starting section 7, there is no danger of the marking section 5 provided with the lettering becoming soiled, or the writing smudged. As soon as the starting section 7 is fastened by the self-adhesive bottom side of the adhesive tape 3 to the cable 8, the cable marking strip 2 is wound with tension around the cable 8, whereby its longer, transparent main section 9 covers and protects the marking section 5. FIG. 3 shows the condition prevailing prior to the application of the end of the adhesive tape 3.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. In a cable marking strip of the type comprising a predominantly transparent adhesive tape with a self-adhesive bottom side, and a hand-inscribable marking section disposed on a top side of the strip, a leading edge of the hand-inscribable marking section extending transversely relative to a long dimension of said strip, the invention wherein said leading edge is located at a distance from the adjacent leading end of the adhesive strip to form between said leading edge and said leading end a non-inscribable portion of said strip suitable for being manually handled for installing the tape onto a cable.

2. In a cable marking strip according to claim 1, wherein said distance is at least 5 mm.

3. In the combination of a cable and a cable marking strip wrapped around said cable, said strip comprising a predominantly transparent adhesive tape with a self-adhesive bottom side facing said cable, a hand-inscribable marking section disposed on a top side of the strip, a leading edge of the hand-inscribable marking section extends transversely relative to a long dimension of said strip and parallel to a longitudinal axis of said cable, the invention wherein said leading edge is located at a distance from the adjacent leading end of the adhesive strip to form between said leading edge and said leading end a non-inscribable portion of said strip.

* * * * *